United States Patent [19]
Barker et al.

[11] Patent Number: 5,111,803
[45] Date of Patent: May 12, 1992

[54] FLARE REDUCTION BUFFER FOR GAS BARBECUES

[75] Inventors: James Barker; Vern Maller, both of Edmonton, Canada

[73] Assignee: Barbecue Innovations Incorporated, Edmonton, Canada

[21] Appl. No.: 725,508

[22] Filed: Jul. 3, 1991

[51] Int. Cl.⁵ ........................... A47J 37/00; F24C 3/00
[52] U.S. Cl. .................................. 126/41 R; 431/326
[58] Field of Search ................ 126/25 R, 41 R, 39 R, 126/39 J, 92 AC, 92 R; 431/125, 326, 328

[56] References Cited

U.S. PATENT DOCUMENTS 4,043,312  8/1977  Kern ................................. 126/41 R
4,290,408  9/1981  Juett et al. ....................... 126/25 R
4,430,597  9/1983  Miller ............................... 126/41 R Primary Examiner—James C. Yeung
Attorney, Agent, or Firm—Burke-Robertson

[57] ABSTRACT

A flare reduction buffer to be situated between a burner element and a grill in a gas barbecue to provide even heating in the barbecue and reduce flare-up during cooking. The buffer comprises a plate having an upper and lower surface, made of impervious heat resistant material and formed with a plurality of pockets spaced from each other in regular fashion over the plate. The pockets each have an entrance, side walls and bottom being oriented so that their entrances open towards the lower surface, perforations being provided in the plate in the bottoms of the pockets.

10 Claims, 1 Drawing Sheet

FLARE REDUCTION BUFFER FOR GAS BARBECUES

TECHNICAL FIELD

The present invention relates to a flare reduction buffer for barbecues, and more particularly to a buffer to sit between a gas burner and a grill of a gas barbecue to provide the barbecue with even heating and a minimum of flare-up during operation.

BACKGROUND OF THE INVENTION

Conventional gas burning barbecues are constructed with cast iron walls supporting a grill on which food to be cooked is held, and beneath which a burner is positioned. Between the burner and the grill is a grate on which a layer of lava or other type of porous rock is supported as a buffer between the flame and food. Ceramic substitutes may be used in place of the lava rock. These rocks absorb grease and other drippings from meat being cooked on the grill to reduce and serve to provide even heating beneath the grill.

Many problems arise through the use of rocks as a buffer for such a system. The rocks may become unevenly distributed on the grate or provide irregular spacing through which the flame from the burner may be exposed directly to the grill, causing uneven heating of food on the grill. As well, when meat is being cooked on the grill, flare-ups often occur when drippings from the meat hit the burner and combust and flash back towards the cooking grill. These flare-ups may char or burn the food being cooked on the grill.

Kern U.S. Pat. No. 4,351,313 issued Sept. 28, 1982 describes and illustrates a molded refractory slab for positioning in a barbecue grill between the burner and the grill. The slab has a plurality of uniformly spaced bosses simulating coals projecting upwardly from the its top surface and an upwardly extending peripheral lip to contain grease and meat juices falling on the slab to prevent their dripping off the slab into the flame. While such a slab construction may distribute heat evenly beneath the cooking grill, it significantly obstructs the heat passing to the grill, essentially reducing the heating process to one of radiation once the slab has been sufficiently heated by the flame below. (In conventional grills, part of the heating occurs as a result of hot air, heated by the flames, rising to the cooking grill.)

Other patents of general background interest include U.S. Pat. No. 4,727,853 of Stephen et.al. issued Mar. 1, 1988 describing a plurality of inverted V-shaped bars acting as sear bars when placed between the grill and burner element of a barbecue by causing grease to evaporate while flowing across their inclined walls, and Canadian Pat. No. 807,390 of Rosa issued Mar. 4, 1969 which describes and illustrates a steak grill with a reversible gas-heated hot plate.

It is an object of the present invention to provide a flare reduction buffer system for barbecues which will replace conventional lava rocks and the like, and which will provide efficient, effective, even heating while reducing flare-ups.

SUMMARY OF THE INVENTION

In accordance with the present invention there is provided a flare reduction buffer to be situated between a burner element and a grill in a gas barbecue to provide even heating in the barbecue and reduce flare-up during cooking. The buffer comprises a plate having an upper and lower surface. The plate is made of impervious heat resistant material and formed with a plurality of pockets spaced from each other in regular fashion over the plate. The pockets each have an entrance, side walls and a bottom and are oriented so that their entrances open towards the lower surface. Perforations are provided in the plate in the bottoms of the pockets.

In a preferred embodiment of the present invention, spaces are provided between the pockets to form channels along the upper surface. As well, perforations are provided in the channels.

The inverted pockets of the buffer construction according to the present invention, as will be described in more detail subsequently, provide a gas barbecue with even heating by trapping heated air and distributng heat evenly within the barbecue while at the same time providing a reduction in flare-up.

BRIEF DESCRIPTION OF THE DRAWINGS

These and other objects and advantages of the invention will become apparent upon reading the following detailed description and upon referring to the drawings in which.

Figure 1:
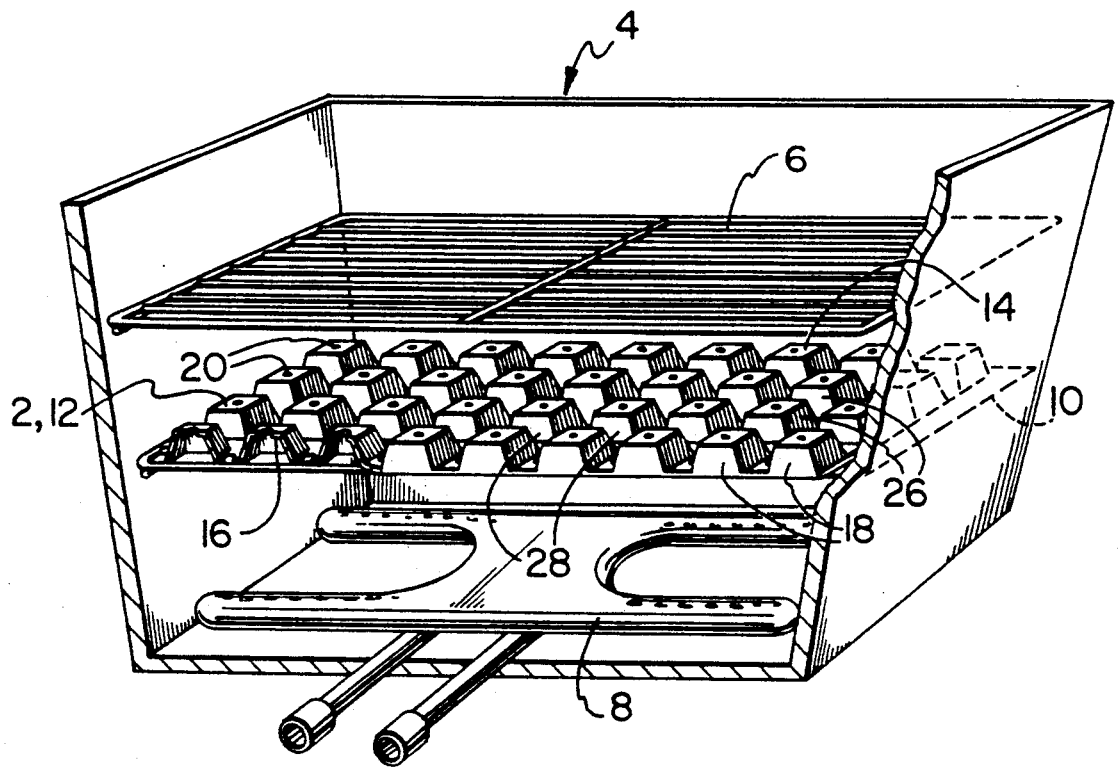
FIG. 1 is a perspective view, from the top, of the flare reduction buffer according to the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals

Figure 2:
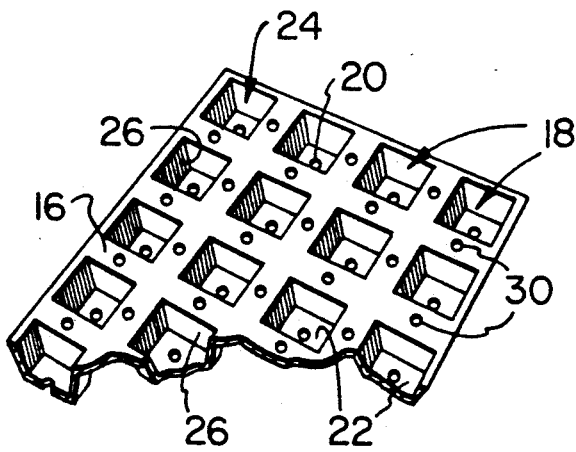
FIG. 2 is a partial perspective view, from the bottom, of the flare reduction buffer of FIG. 1.

As can be seen in FIGS. 1 and 2, there is provided a flare reduction buffer 2 for a gas burning barbecue 4, buffer 2 to be positioned between food cooking grill 6 and burner element 8 of the barbecue, for example, supported on grate 10.

Buffer 2 is in the form of a plate 12, as illustrated, which plate is formed of heat resistant material, possibly from cast iron, cast aluminum, stainless steel, porcelain coated metal, ceramic, special plastics or various combinations thereof dependent upon the desired buffer characteristics Buffer 2 is of any appropriate size and shape, but will likely in most instances be formed of rectangular shape to suit conventional gas barbecues Its construction, as will be described in more detail hereinafter, permits it to be developed and formed from several standard lengths and widths that could then be used in combination to provide a universal approach to the specific dimensional requirements of the various sizes of gas barbecues. In this manner, a minimum of standard forms would fit a great majority of the sizes of the lower housing (casting) of gas barbecues 4. Extending above upper surface 14 of plate 12, but opening from lower surface 16 are a plurality of pockets 18, each with a perforation 20 in its bottom 22. As can be seen in FIG. 2, pockets 18 are each provided with an entrance 24 and sidewalls 26 in addition to bottom 22. While pockets may be of any desired configuration, they are illustrated as having a generally rectangular configuration, with a rectangular entrance 24 of somewhat larger peripheral dimension than rectangular bottom 22. In this manner, sidewalls 26 become narrower and more constricted between entrance 24 and bottom 22 as illustrated.

Between pockets 18 on upper surface 14 extend a plurality of channels 28, as illustrated, these channels similarly being provided with spaced perforations 30 as illustrated.

In the illustrated embodiment, pockets 18 and channels 28 are arranged in rows extending sideways and lengthwise across plate 12. Other designs of pockets 18 and channels 28 would of course be possible and provide for effective operation of buffer 2.

Figure 3:
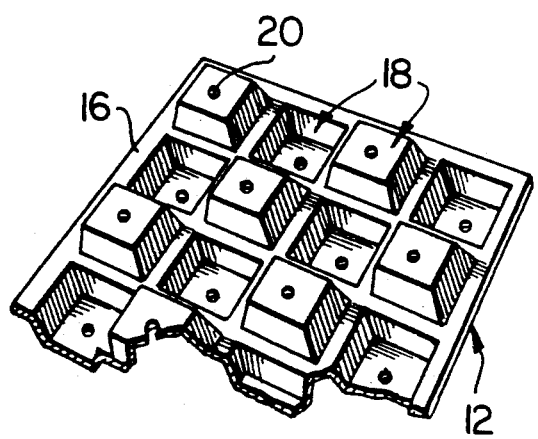
FIG. 3 is a partial perspective of a further embodiment of flare redu tion buffer in accordance with the present invention.

It is preferred that buffer 2 be reversible, so tha orientation of its upper and lower surfaces 14 and 16 ca be reversed and the buffer operate as effectively in this reversed orientation. The symmetrically designed plate 12, as illustrated, allows this. This provides a self-cleaning feature in that any accumulated build-up of food debris on one surface would be burnt off to fine ash by turning over the plate so that that surface is facing the burner element 8. As illustrated in FIG. 3, such a reversible operation of plate is preferably provided by a symmetrical design of pockets with perforations 20 therein, oppositely extending in similar symmetrical or regular fashion on both surfaces 14 and 16 of plate 12. In this regard, pockets 18 and channels 28 may be constructed so that the volume provided in channels 28 (FIGS. 1 and 2) or pockets 18 (FIGURES) in upper surface 14 is roughly equivalent to the volume provided in pockets 18 in the lower surface, so that similar characteristics to the operation of buffer 2 are provided regardless of which surface of the plate is oriented upwardly.

In addition, the size of perforations 20, and the size, location and number of perforations 30 is preferably such as to permit enough heated air to pass upwardly through those perforations, so that the temperature around the burner does not build-up excessively, potentially causing premature deterioration of the functional components of the existing gas barbecues.

In operation, pockets 18 when in the orientation illustrated in FIG. 1, trap hot air and smoke rising off burner element 8 and allow heated air to rise to the cooking grill 6 above to assist in the cooking process. Sufficient heat is retained in plate 12 to provide both radiant heat for cooking and to vaporize most food drippings (juices, fats, falling on upper surface 14 from grill 6), into smoke. Perforations 20 and 30 are sufficiently small in size to block most food drippings from falling directly to burner 8 and hence to block the majority of the flare-ups within barbecue 4.

Thus it is apparent that there has been provided in accordance with the invention a flare reduction buffer for gas barbecues that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A flare reduction buffer to be situated between a burner element and a grill in a gas barbacue to provide even heating in the barbecue and reduce flare-up during cooking, the buffer comprising a plate having upper and lower surfaces, made of impervious heat resistant material and formed with a plurality of pockets spaced from each other in regular fashion over the plate, the pcokets each having an entrance, side walls and bottom being oriented so that their entrances open towards the lower surface, performations being provided in the plate in the bottoms of the pockets and the spaces between the pockets forming channels along the upper surface.

2. A buffer according to claim 1, wherein performations are provided in the plate in the channels.

3. A buffer according to claim 2 wherein pockets are provided oppositely extending in regular fashion on both upper and lower surfaces so that the buffer provides similar characteristics for cooking in either surface orientation.

4. A buffer according to claim 3 wherein the perforations are of a size and positioned, during operation, to permit passage of hot air through them to facilitate cooking on the grill and maximize vaporization of dripping on the upper surface of the buffer.

5. A buffer according to claim 1 made of a heat resistant material selected from the group comprising cast iron, cast aluminum, stainless steel, porcelain coated metal, ceramic, special plastics and combinations thereof.

6. A buffer according to claim 1 wherein the plate is of rectangular shape and the pockets and channels are in rows extending sideways and lengthwise o the plate.

7. A buffer according to claim 1 wherein the entrance and bottom are of rectangular configuration, and the walls extend in narrowing fashion from the entrance to the base.

8. A flare reduction buffer to be situated between a burner element and a grill in a gas barbecue to provide even heating in the barbecue and reduce flare-up during cooking, the buffer comprising a plate having an upper and lower surface, made of impervious heat resistant material and formed with a plurality of pockets spaced from each other in regular fashion over the plate, the pockets each having an entrance, side walls and a bottom being oriented so that their entrances open towards the lower surface, spaces being provided between the pockets to form channels along the upper surface, perforations being provided in the plate in the bottoms of the pockets and in the channels, the volume provided in the channels on the upper surface being roughly equal to the volume provided in the pockets from the lower surface and the perforations in the channels and perforations in the bottoms of the pockets being of a location and of a shape so that the buffer provides similar characteristics for cooking in either surface orientation.

9. A buffer according to claim 8 wherein the plate is of rectangular shape and the pockets and channels are in rows extending sideways and lengthwise on the plate.

10. A flare reduction buffer to be situated between a burner element and a grill in a gas barabecue to provide even heting in the barbecue and recude flare-up during cooking, the buffer comprising a plate having an upper and lower surface, made of impervious heat resistant material and formed with a plurality of pockets spaced from each other in regular fashion over the plat3, the pockets each having an entrance, side walls and a bottom being oriented alternatively so that their entrances open towards the upper and lower surfaces, perforations being provided in the plate in the bottoms of the pcokets, the volume provided in the pockets in the upper surface being roughly equivalent to the volume provided in the pockets in the lower surface and the perforations in the bottom of the pockets being of a location and of a shape so that the buffer provides similar characteristics for cooking in either surface orientation.

* * * * *